(12) United States Patent
Seo et al.

(10) Patent No.: US 7,729,554 B2
(45) Date of Patent: Jun. 1, 2010

(54) DISPLAY APPARATUS AND CONTROL METHOD THEREOF

(75) Inventors: Young-joo Seo, Suwon-si (KR); Bong-su Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 994 days.

(21) Appl. No.: 11/483,635

(22) Filed: Jul. 11, 2006

(65) Prior Publication Data
US 2007/0030397 A1    Feb. 8, 2007

(30) Foreign Application Priority Data
Jul. 14, 2005    (KR) .................. 10-2005-0063887

(51) Int. Cl.
*G06K 9/40* (2006.01)
(52) U.S. Cl. ..................... 382/254; 348/542
(58) Field of Classification Search ................ 345/470; 348/208.13, 270–280, 542, 554, 627, 665–670, 348/E5.088, E9.042; 382/254, 260–269, 382/275; 700/109; 712/E9.008
See application file for complete search history.

(56) References Cited

U.S. PATENT DOCUMENTS

| | | | | |
|---|---|---|---|---|
| 5,646,680 A | * | 7/1997 | Yajima | 348/74 |
| 5,999,227 A | * | 12/1999 | Doherty et al. | 348/564 |
| 7,242,408 B1 | * | 7/2007 | Dunn | 345/582 |
| 2003/0051249 A1 | * | 3/2003 | Hoang | 725/95 |
| 2003/0090594 A1 | * | 5/2003 | Lim | 348/625 |
| 2006/0007358 A1 | * | 1/2006 | Kim | 348/553 |

FOREIGN PATENT DOCUMENTS

| | | |
|---|---|---|
| JP | 61-029212 | 2/1986 |
| KR | 1996-0028253 | 7/1996 |
| KR | 1999-0086459 | 12/1999 |
| KR | 10-2000-0040644 | 7/2000 |

\* cited by examiner

*Primary Examiner*—Matthew C Bella
*Assistant Examiner*—Gregory F Cunningham
(74) *Attorney, Agent, or Firm*—Roylance, Abrams, Berdo & Goodman, L.L.P.

(57) ABSTRACT

A display apparatus comprises a user input unit; an image processor operating in one of a first image processing mode performing a first image processing operation and at least one second image processing operation on an input image signal, and a second image processing mode not performing at least one second image processing operation on the input image signal. A controller controls the image processor to operate in one of the first image processing mode and the second image processing mode, according to a manipulation of the user input unit. Accordingly, a display apparatus performs in an image processing mode in which an image processing time is reduced, according to a user's selection.

10 Claims, 7 Drawing Sheets

DISPLAY APPARATUS AND CONTROL METHOD THEREOF

CROSS-REFERENCE TO RELATED APPLICATIONS

This application claims benefit under 35 U.S.C. §119(a) of Korean Patent Application No. 2005-0063887, filed on Jul. 14, 2005, in the Korean Intellectual Property Office, the entire disclosure of which is hereby incorporated by reference.

BACKGROUND OF INVENTION

1. Field of Invention

The present invention relates to a display apparatus and a control method thereof. More particularly, the present invention relates to a display apparatus for processing images according to modes, and a control method thereof.

2. Description of the Related Art

In general, display apparatuses perform several image processing operations on image signals to process the image signals. Typical image processing operations include an analog-to-digital converting (ADC) operation, a scaling operation, an interlaced to progressive converting (IPC) operation, and a picture quality enhancing operation.

Here, the ADC operation converts analog image signals into digital image signals which can be processed by respective components in a display apparatus. The scaling operation converts resolutions of image signals in correspondence to a resolution of a display unit. The IPC operation converts interlaced scanning signals into sequential scanning signals. The picture quality enhancing operation performs filtering, outline correction, noise removal, and so on, on image signals in order to improve the picture quality of images which are displayed on a display unit.

As such, since many image processing operations must be performed to process an image signal, a predetermined time delay occurs.

Meanwhile, in the case of recent display apparatuses which are used in connection to an apparatus with a game function, such as a Sony PlayStation® or Microsoft Xbox®, for example, time delays caused by the above-described phenomena are more problematic.

That is, when a user controls operations suitable to various games while watching a screen of a display apparatus in real time, a manipulation of the user is not directly reflected on an image of the screen due to such a time delay. As a result, the user cannot properly use the game function, thus suffering inconvenience.

Accordingly, there is required a method of reducing an image signal processing time by changing image processing modes according to a user's selection, when an image on a screen should be directly changed according to a manipulation of a user input unit with minimal time delay, like when a game function is executed.

SUMMARY OF THE INVENTION

Accordingly, it is an aspect of the present invention to provide a display apparatus for performing an image processing mode in which an image processing time is reduced, according to a user's selection, and a control method thereof.

Additional aspects of the present general inventive concept will be set forth in part in the description which follows and, in part, will be obvious from the description, or may be learned by practice of the general inventive concept.

The foregoing and/or other aspects of the present invention can be achieved by providing a display apparatus comprising a user input unit; an image processor operating in one of a first image processing mode for performing a first image processing operation and at least one second image processing operation on an input image signal, and a second image processing mode for not performing at least one second image processing operation on the input image signal. A controller controls the image processor to operate in one of the first image processing mode and the second image processing mode, according to a manipulation of the user input unit.

According to an aspect of the present invention, the second image processing operation comprises an interlaced to progressive converting (IPC) operation and a picture quality enhancing operation for adjusting a display characteristic of an image to be displayed on a screen.

According to an aspect of the present invention, the display apparatus further comprises a display unit on which an image is displayed, and a menu generation unit for displaying a menu on the display unit, wherein the controller controls the menu generation unit so that a mode selection menu including items respectively corresponding to the first image processing mode and the second image processing mode is displayed on the display unit, and controls the image processing unit not to perform at least one second image processing operation if the item corresponding to the second image processing mode is selected according to a manipulation of the user input unit.

According to an aspect of the present invention, the display apparatus further comprises a display unit on which an image is displayed, and a menu generation unit for displaying a menu on the display unit, wherein the controller controls the menu generation unit so that a mode selection menu including items respectively corresponding to the IPC operation and the picture quality enhancing operation is displayed on the display unit, and controls the image processor not to perform an operation corresponding to the selected item if one of the items respectively corresponding to the IPC operation and/or the picture quality enhancing operation is selected according to a manipulation of the user input unit.

The foregoing and/or other aspects of the present invention can be also achieved by providing a control method of a display apparatus for performing a first image processing operation and a second image processing operation on an input image signal to display an image. The control method comprises selecting one of a first image processing mode and a second image processing mode, and performing the first image processing operation and the second image processing operations if the first image processing mode is selected, and not performing at least one of the second image processing operation if the second image processing mode is selected.

According to an aspect of the present invention, the first image processing operation comprises an analog-to-digital converting (ADC) operation and a scaling operation, and the second image processing operations comprises an interlaced to progressive converting (IPC) operation and a picture quality enhancing operation for adjusting a display characteristic of an image to be displayed on a screen.

According to an aspect of the present invention, the control method further comprises displaying a mode selection menu including items respectively corresponding to the first image processing mode and the second image processing mode, wherein in the performing step, if the item corresponding to the second image processing mode is selected, not performing at least one second image processing operation.

It is to be understood that both the foregoing general description and the following detailed description are exemplary and explanatory and are intended to provide further explanation of the invention as claimed.

BRIEF DESCRIPTION OF THE DRAWINGS

The above and/or other aspects and advantages of exemplary embodiments of the prevent invention will become apparent and more readily appreciated from the following description, taken in conjunction with the accompany drawings, in which.

Throughout the drawings, like reference numbers should be understood to refer to like elements, features and structures.

DETAILED DESCRIPTION OF EXEMPLARY EMBODIMENTS

Reference will now be made in detail to exemplary embodiments of the present invention. The exemplary embodiments are described below so as to explain the present invention with reference to the attached figures.

Figure 1:
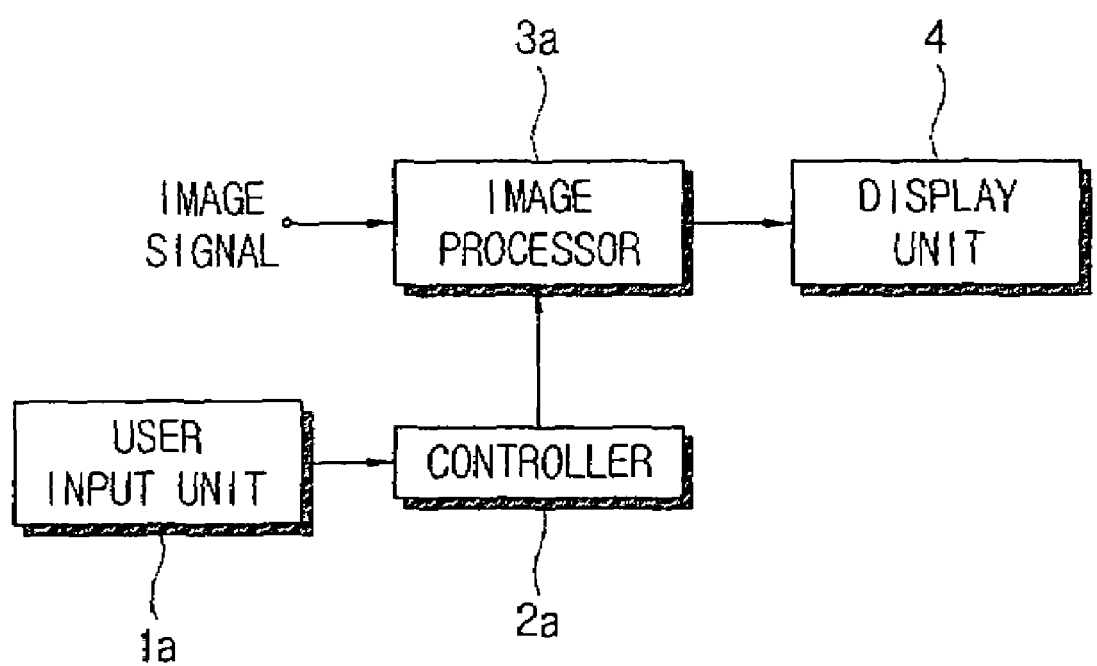
FIG. 1 illustrates a control block of a display apparatus according to a first embodiment of the present invention.

Referring to FIG. 1, a display apparatus according to a first embodiment of the present invention includes a user input unit 1*a*, an image processor 3*a*, a controller 2*a*, and a display unit 4.

The user input unit 1*a* is provided to allow a user to select modes in which the image processor 3*a* (will be described later) processes images. The user input unit 1*a* may be implemented as a button on the display apparatus or as a remote controller, connected wirelessly or with a wire to the display apparatus.

The image processor 3*a* can operate in any one of a first image processing mode for performing a first image processing operation and at least one second image processing operation on an input image signal, and a second image processing mode for not performing at least one second image processing operation on an input image signal.

Figure 2A:
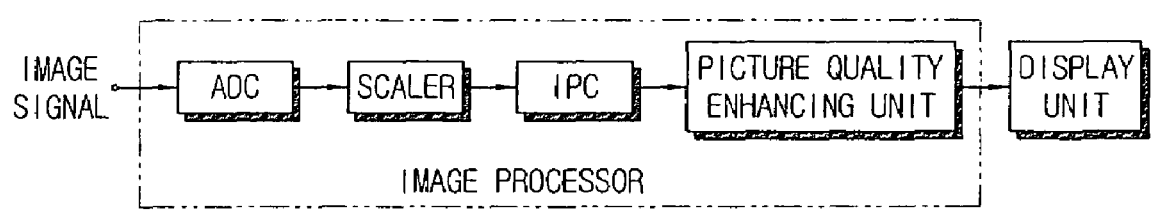
FIGS. 2A and 2B illustrate examples of functional blocks of an image processor illustrated in FIG. 1.

For performing the operations, as shown in FIG. 2A, the image processor 3*a* may include an analog-to-digital converter (ADC), a scaler, an IPC unit, and a picture quality enhancing unit.

Here, the ADC converts an input analog image signal into a digital image signal for various processing operations, and the scaler adjusts a resolution of the digital image signal. If the input image signal is an interlaced scanning signal, the IPC unit converts the interlaced scanning signal into a sequential scanning signal. The picture quality enhancing unit removes noise of the image signal, corrects the outline of the image signal, and performs various filtering operations.

In FIG. 2A, various components included in the image processor 3A are independently divided, but, the respective components may operate in a different order or be integrated as functions performed by a single chip.

Here, the first image processing operation may include an ADC (analog-to-digital converting) operation which is performed by the ADC and a scaling operation which is performed by the scaler.

The second image processing operation may include an interlaced to progressive converting (IPC) operation which is performed by the IPC unit and a picture quality enhancing operation which is performed by the picture quality enhancing unit.

The first image processing operation and the second image processing operation are classified according to whether the operation is essential in displaying images. That is, processes which are essential in displaying images can be classified as the first image processing operation, and additional processes, such as changing the picture quality of images to be displayed, can be classified as the second image processing operation.

Since the first image processing mode performs all of the first image processing operations and the second image processing operations, the first image processing mode can display high-quality images. Since the second image processing mode does not perform at least one of the second image processing operations, the second image processing mode can reduce an image processing time.

The controller 2*a* controls the image processor 3*a* to operate in any one of the first image processing mode and the second image processing mode according to a manipulation of the user input unit 1*a*.

Figure 2B:
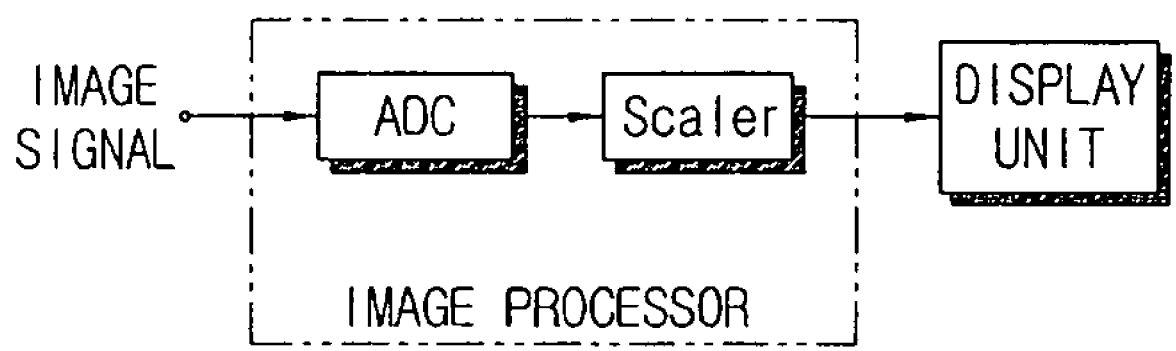

That is, the controller 2*a* can control the image processor 3*a* to operate in any one of the first image processing mode of performing all image processing operations through the ADC, the scaler, the IPC unit, and the picture quality enhancing unit, as shown in FIG. 2A, and the second image processing mode of not performing image processing operations by the IPC unit and the picture quality enhancing unit, as shown in FIG. 2B. It should be understood that all functional blocks shown in FIG. 2A are actually included in the embodiment illustrated in FIG. 2B. The functional blocks of FIG. 2A not shown in FIG. 2B are omitted because they do not operate.

Accordingly, users can select the operation mode of the display apparatus, so that the display apparatus operates in the first image processing mode, for example; when it is needed to improve the picture quality of images, and operates in the second image processing mode, for example, when it is needed to reduce an image processing time.

Figure 3:
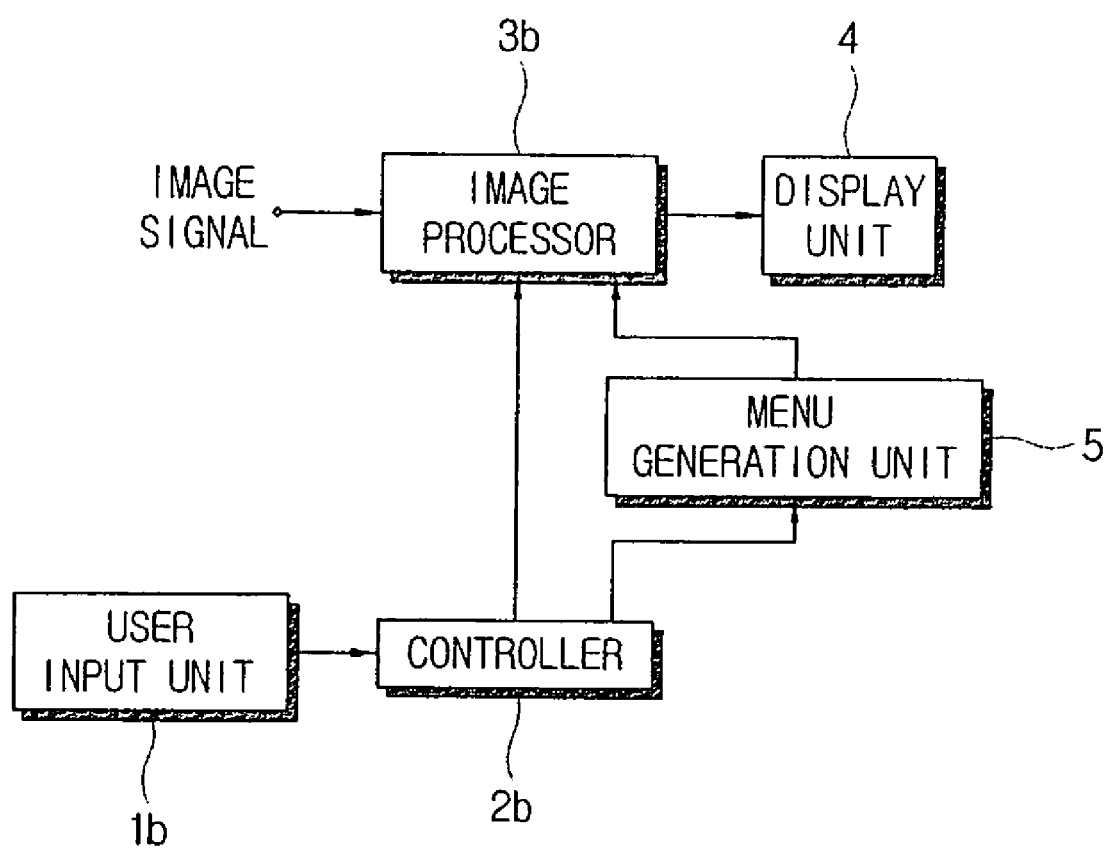
FIG. 3 illustrates a control block of a display apparatus according to a second embodiment of the present invention.

Meanwhile, referring to FIG. 3, a display apparatus according to a second embodiment of the present invention includes a user input unit 1*b*, an image processor 3*b*, a menu generation unit 5, a controller 2*b*, and a display unit 4.

Here, the user input unit 1*b*, the image processor 3*b*, the controller 2*b*, and the display unit 4 operate in the same manner as the corresponding components of FIG. 1.

The menu generation unit 5 displays a menu including items corresponding to the first image processing mode and the second image processing mode on the display unit 4.

Figure 4A:
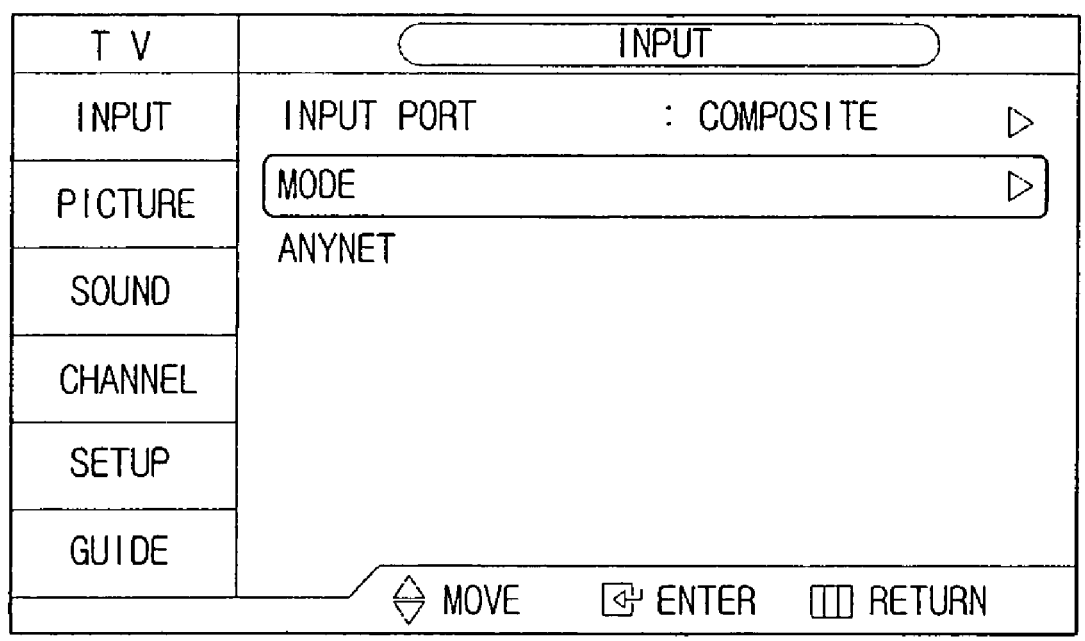
FIGS. 4A and 4B show a menu generated by a menu generation unit illustrated in FIG. 3.
Figure 4B:
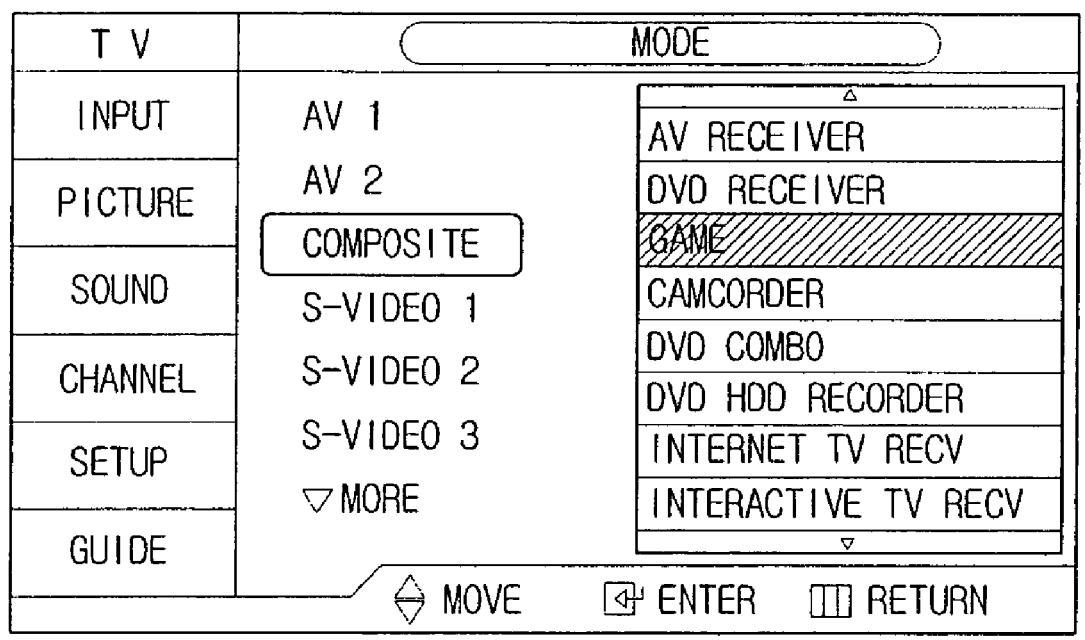

For example, if a game machine is connected to a composite port for receiving CVBS, as shown in FIGS. 4A and 4B, a "game" item can be selected. If a game item is selected on the display unit 4 according to a manipulation of the user input unit 1*b*, the controller 2*b* may control the image processor 3*b* to operate in the second image processing mode.

FIG. 4B illustrates an example in which an image processing mode is selected and executed. Differently from the example illustrated in FIG. 4B, a menu for selecting functions of the image processing mode may be displayed. For example, the controller 2*b* may control the menu generation unit 5 so that items corresponding to the IPC operation and the picture quality enhancing operation are displayed on the display unit 4, and also may control the image processor 3*b* so that an image processing operation corresponding to an item selected according to a manipulation of the user input unit 1*b* is not performed.

Figure 5:
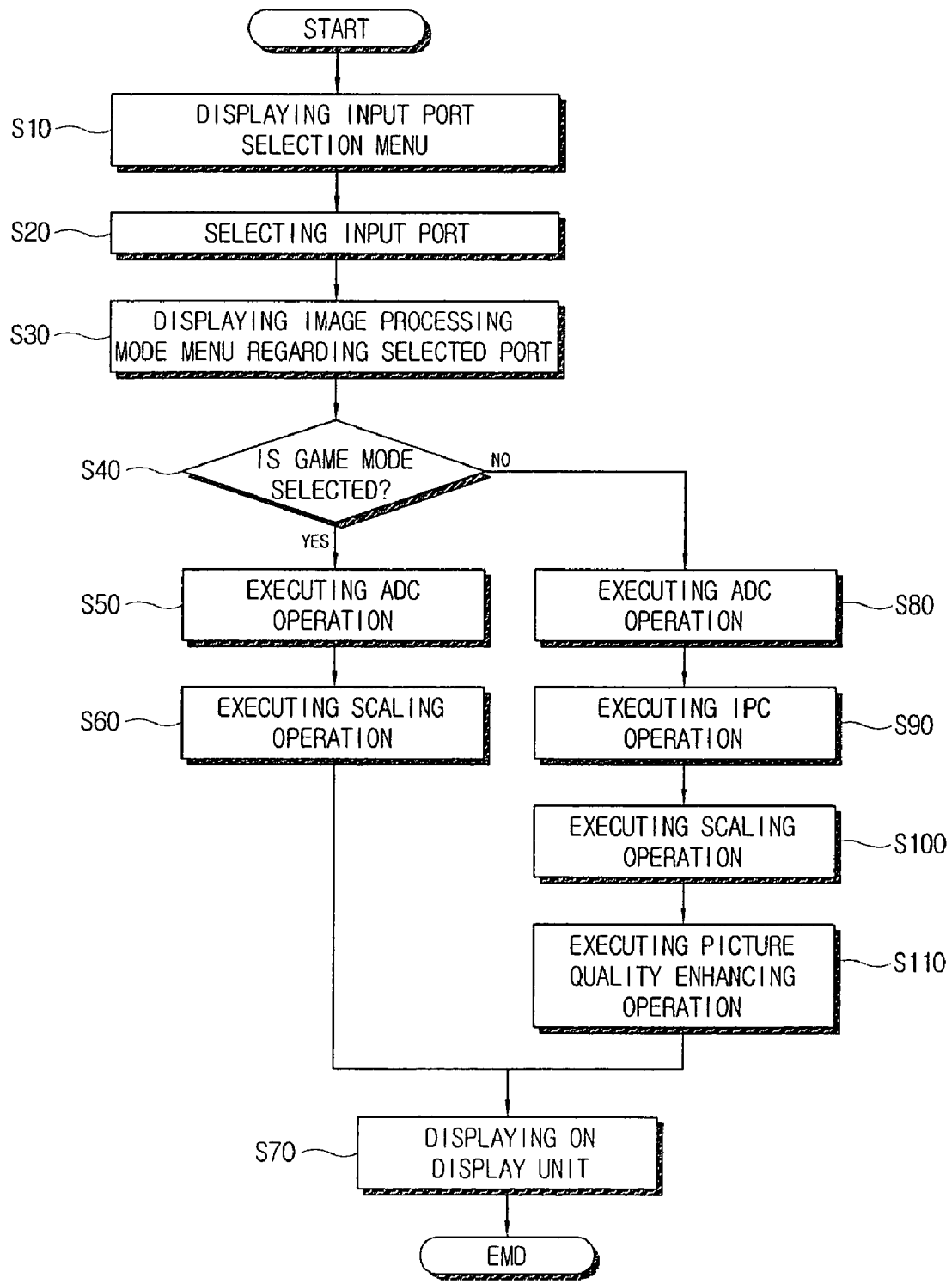
FIG. 5 is a flowchart illustrating a method for controlling the display apparatus according to the second embodiment of the present invention.

Hereinafter, a control method of the display apparatus according to the second embodiment of the present invention will be described in detail with reference to FIG. 5. In this embodiment, it is assumed that a game machine is connected to a composite port of the display apparatus and the user input unit 1*b* is a remote controller.

If a user presses an input port button of the remote controller to select an input port of the display unit 4, an input port selection menu generated by the menu generation unit 5 is displayed on the display unit 4 (operation S10).

If an input port supported by the display apparatus is selected (operation. S20); an image processing mode menu regarding the selected port is displayed (operation 830). In this embodiment, it is assumed that a composite port is selected.

If a game mode is selected from the image processing mode menu (operation S40), an analog image signal received through the composite port is converted into a digital image signal by the ADC (operation S50). A resolution of the digital image signal is converted into a proper resolution by the scaler (operation S60) and then the converted image signal is displayed on the display unit 4 (operation S70)

Meanwhile, if one of image processing modes other than the game mode is selected, an analog image signal received through the composite port is converted into a digital image signal by the ADC (operation S80). Then, if the digital image signal is an interlaced scanning signal, the digital image-signal is converted into a sequential scanning image signal by the IPC unit (operation S90). Then, a resolution of the resultant image signal is converted into a proper resolution by the scaler (operation S100). Successively, filtering, such as noise removal, outline correction, etc., is performed on the image signal so that the picture quality of the image signal is enhanced (operation S110). Then, the resultant image signal is displayed on the display unit 4 (operation S70).

In this embodiment, there is described a case where a mode in which a predetermined image processing time is reduced is a game mode, however, the present invention is not limited to the case and it is also possible that an image processing time is reduced in different modes.

As described above, according to an exemplary embodiment of the present invention, an image processing mode in which an image processing time is reduced can be performed according to a user's selection. Particularly, the image processing time can be reduced below 100 ms which is a minimal delay time which can be recognized by users. Therefore, in the case where a manipulation of a user input unit is directly reflected to an image on a screen, such as with a game console, or the like, inconvenience due to time delay can be prevented.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
   a user input unit;
   an image processor operating in one of a first image processing mode for performing a first image processing operation and at least one second image processing operation on an input image signal, to enhance a picture quality of an image, and a second image processing mode for performing the first image processing operation but not performing the second image processing operation on the input image signal, to reduce a predetermined image processing time; and
   a controller for controlling the image processor to operate in one of the first image processing mode and the second image processing mode, according to a manipulation of the user input unit.

2. The display apparatus according to claim 1, wherein the second image processing operation comprises an interlaced to progressive converting (IPC) operation and a picture quality enhancing operation for adjusting a display characteristic of an image to be displayed on a screen.

3. The display apparatus according to claim 1, further comprising:
   a display unit on which an image is displayed, and a menu generation unit for displaying a menu on the display unit,
   wherein the controller controls the menu generation unit so that a mode selection menu including items respectively corresponding to the first image processing mode and the second image processing mode is displayed on the display unit, and controls the image processing unit to perform the first image processing operation but not to perform the second image processing operation if the item corresponding to the second image processing mode is selected according to a manipulation of the user input unit.

4. The display apparatus according to claim 2, further comprising:
   a display unit on which an image is displayed, and a menu generation unit for displaying a menu on the display unit,
   wherein the controller controls the menu generation unit so that a mode selection menu including items respectively corresponding to the IPC operation and the picture quality enhancing operation is displayed on the display unit, and controls the image processor to perform the first image processing operation but not to perform an operation corresponding to the selected item if one of the items respectively corresponding to the IPC operation and/or the picture quality enhancing operation is selected according to a manipulation of the user input unit.

5. A control method of a display apparatus for performing a first image processing operation and a second image processing operation on an input image signal to display an image, the control method comprising:
   (a) selecting one of a first image processing mode for enhancing a picture quality of the image and a second image processing mode for reduce a predetermined image processing time; and
   (b) performing the first image processing operation and the second image processing operation if the first image processing mode is selected, and performing the first image processing operation but not performing the second image processing operation if the second image processing mode is selected.

6. The control method according to claim 5, wherein the first image processing operation comprises an analog-to-digital converting (ADC) operation and a scaling operation, and
   the second image processing operation comprises an interlaced to progressive converting (IPC) operation and a picture quality enhancing operation for adjusting a display characteristic of an image to be displayed on a screen.

7. The control method according to claim 5, further comprising:

displaying a mode selection menu including items respectively corresponding to the first image processing mode and the second image processing mode, wherein in step (b), if the item corresponding to the second image processing mode is selected, performing the first image processing operation but not performing the second image processing operation.

8. A display apparatus comprising:

an image processor operating in one of a first image processing mode for enhancing a picture quality and a second image processing mode for reducing a predetermined image processing time on an input image signal;

a display unit on which the image processed by the image processor is displayed;

a menu generation unit generating a mode selection menu including items corresponding to the first image processing mode and the second image processing mode respectively; and a controller controls the menu generation unit to generate the mode selection menu for enabling it to be displayed on the display unit, and controls the image processor, so that a picture quality of the image processed by the first image processing mode different from a picture quality of the image processed by the second image processing is displayed on the display unit.

9. The display apparatus according to claim 8, wherein the input image signal is analog, and the controller controls the image processor to perform an interlaced to progressive converting (IPC) operation and the picture quality enhancing operation for adjusting a display characteristic of the image to be displayed on the display unit after to convert the analog input image signal to a digital signal and to perform scaling operation when the first image processing mode is selected by the user input unit.

10. The display apparatus according to claim 8, wherein the input image signal is analog, and the controller controls the image processor to convert the analog input image signal to a digital signal and to perform a scaling operation when the second image processing mode is selected by the user input unit.

* * * * *